US010684751B2

(12) United States Patent
Miyashita et al.

(10) Patent No.: US 10,684,751 B2
(45) Date of Patent: Jun. 16, 2020

(54) DISPLAY APPARATUS, DISPLAY METHOD, AND PROGRAM

(75) Inventors: Ken Miyashita, Tokyo (JP); Tatsushi Nashida, Kanagawa (JP); Kouichi Matsuda, Tokyo (JP)

(73) Assignee: SONY CORPORATION, Tokyo (JP)

( * ) Notice: Subject to any disclaimer, the term of this patent is extended or adjusted under 35 U.S.C. 154(b) by 1340 days.

(21) Appl. No.: 12/536,104

(22) Filed: Aug. 5, 2009

(65) Prior Publication Data

US 2010/0037183 A1 Feb. 11, 2010

(30) Foreign Application Priority Data

Aug. 11, 2008 (JP) ................. P2008-207432

(51) Int. Cl.
  G06F 3/0484 (2013.01)
  G06F 3/0481 (2013.01)
  G06F 40/242 (2020.01)
  G06F 3/0488 (2013.01)
  G06F 40/40 (2020.01)
  G06F 3/0485 (2013.01)

(52) U.S. Cl.
  CPC ........ G06F 3/04842 (2013.01); G06F 3/0481 (2013.01); G06F 3/0485 (2013.01); G06F 3/0488 (2013.01); G06F 3/04883 (2013.01); G06F 40/242 (2020.01); G06F 40/40 (2020.01)

(58) Field of Classification Search
  CPC .. G06F 3/0486; G06F 3/04812; G06F 3/0481; G06F 3/0488; G06F 3/0485; G06F 3/04883; G06F 40/242; G06F 40/40; G06F 3/04842; G06F 3/017

USPC ............................. 715/711, 860, 862
See application file for complete search history.

(56) References Cited

U.S. PATENT DOCUMENTS

| | | | |
|---|---|---|---|
| 5,784,061 A * | 7/1998 | Moran et al. | 715/863 |
| 5,808,601 A * | 9/1998 | Leah et al. | 715/856 |
| 6,031,531 A * | 2/2000 | Kimble | 715/862 |
| 6,188,405 B1 | 2/2001 | Czerwinski et al. | |
| 7,278,115 B1 | 10/2007 | Conway et al. | |
| 2001/0034742 A1 | 10/2001 | Stinson | |

(Continued)

FOREIGN PATENT DOCUMENTS

| | | |
|---|---|---|
| JP | 63-153626 | 6/1988 |
| JP | 1-283583 | 11/1989 |

(Continued)

OTHER PUBLICATIONS

European Search Report dated Nov. 15, 2010, in the Hague, in corresponding European patent application EP 09 25 1872.

*Primary Examiner* — Nicholas Ulrich

(74) *Attorney, Agent, or Firm* — Paratus Law Group, PLLC

(57) ABSTRACT

A display method including the steps of displaying document data and/or content data including a plurality of objects, controlling an arrangement position of a translucent focus area on a display unit, where the focus area is provided to make the object enter a selection state, detecting a position on the display unit, where a user contacts the display unit at the position, and moving the focus area as the contact position is moved when the detected arrangement position of the focus area is approximately equivalent to the detected contact position is provided.

23 Claims, 16 Drawing Sheets

(56) References Cited

U.S. PATENT DOCUMENTS

| | | | |
|---|---|---|---|
| 2002/0039915 A1* | 4/2002 | Hama | G06F 3/0482 455/566 |
| 2003/0164855 A1* | 9/2003 | Grant et al. | 345/763 |
| 2003/0179239 A1* | 9/2003 | Lira | G06F 3/0485 715/776 |
| 2003/0206189 A1* | 11/2003 | DeMello | G06F 3/0481 715/711 |
| 2004/0240730 A1* | 12/2004 | Rinehart | 382/162 |
| 2005/0012723 A1* | 1/2005 | Pallakoff | 345/173 |
| 2005/0221893 A1 | 10/2005 | Ohta | |
| 2006/0022955 A1* | 2/2006 | Kennedy | 345/173 |
| 2006/0059437 A1* | 3/2006 | Conklin, III | 715/800 |
| 2006/0277470 A1* | 12/2006 | Schneider et al. | 715/719 |
| 2007/0022391 A1* | 1/2007 | Kim et al. | 715/856 |
| 2007/0028189 A1* | 2/2007 | Robbins | G06F 3/0481 715/853 |
| 2007/0130563 A1* | 6/2007 | Elgazzar | G06F 17/289 717/137 |
| 2007/0198942 A1* | 8/2007 | Morris | 715/767 |
| 2007/0236475 A1* | 10/2007 | Wherry | G06F 3/0485 345/173 |
| 2007/0260452 A1* | 11/2007 | Lee | G06F 17/2735 704/10 |
| 2008/0141126 A1* | 6/2008 | Johnson | G06F 17/212 715/273 |
| 2008/0158164 A1* | 7/2008 | Lee | G06F 1/1626 345/173 |
| 2008/0316181 A1* | 12/2008 | Nurmi | 345/173 |
| 2009/0058801 A1* | 3/2009 | Bull | 345/157 |
| 2009/0228792 A1* | 9/2009 | van Os et al. | 715/702 |
| 2009/0228818 A1* | 9/2009 | Hebard | 715/768 |
| 2009/0325607 A1* | 12/2009 | Conway et al. | 455/456.3 |

FOREIGN PATENT DOCUMENTS

| | | |
|---|---|---|
| JP | 4-291299 | 10/1992 |
| JP | 11-143677 | 5/1999 |

* cited by examiner

DISPLAY APPARATUS, DISPLAY METHOD, AND PROGRAM

BACKGROUND OF THE INVENTION

1. Field of the Invention

The present invention relates to a display apparatus, a display method, and a program that can be appropriately used for, for example, a mobile terminal provided with a touch panel.

2. Description of the Related Art

In the past, when text data (hereinafter referred to as document data) displayed on a display screen image and/or an object included in content data such as video, the object including word data, photograph data, etc., was selected by a user, information attached to the object was displayed as a pop-up menu. For example, when the object included data of an English word, a Japanese equivalent for the English word was displayed as the attached information, and when the object was an icon indicating some function, help information relating to the function was displayed.

The attached information of the object is displayed when the right button of a mouse is clicked when the cursor of the mouse is arranged on a certain object and/or when the cursor is arranged on a predetermined object. When the right mouse button is clicked, the attached information is displayed as a context menu, etc., and when the cursor is placed on the object, the attached information is displayed through a tooltip or the like.

For example, Japanese Unexamined Patent Application Publication No. 1-283583 discloses a technology for displaying information about a function indicated by an icon as a pop-up menu at the time when a cursor is placed on the icon.

SUMMARY OF THE INVENTION

In recent years, touch panels have been increasingly used for apparatuses including a mobile phone terminal, a personal digital assistant (PDA), a game terminal, etc. When the touch panel is used as a user interface, the user of the apparatus can operate the apparatus through intuition. Further, since another user interface including a mouse, etc. may not be provided, the mobility of the apparatus is increased.

In the case where the touch panel is used, a tap operation achieved by lightly tapping on the image area is often associated with the most appropriate behavior for an object arranged at the position of the tapped part of the image area. For example, when the image area is tapped at a position where a predetermined track is displayed while data of a player provided to reproduce music data and the track list are displayed on the display screen image, the track is not only simply selected but also reproduced.

For performing the same operation by using a mouse, different operations may be individually assigned to different types of behaviors. For example, a single click may be performed to select a track and a double click may be performed to reproduce the track. In the case where the touch panel is used, the operation corresponding to the double click is a double tap. However, since it is difficult to perform the double tap on the touch panel in terms of human engineering, the double tap has hardly been performed as the trigger of some behavior. That is to say, in the case where the touch panel is used, it becomes difficult to perform various kinds of operations that can be performed through the mouse.

Accordingly, for achieving the above-described operation performed to display the attached information of the object through the tooltip on the touch panel, it is eligible to create the state where attention is given to a certain object even though the object is not tapped. The use of a touch panel that can detect the magnitude of a pressure put on the display screen image allows for differentiating between the state where the attention is given to a certain object even though the object is not tapped and the state where the object is selected. Further, it becomes possible to display the attached information of the object as a pop-up menu in the former state.

However, if it is difficult for the user to adjust the pressure with high precision, the usability of the above-described user interface is low for the user.

Accordingly, the present invention allows for performing various kinds of behaviors (operations) in an apparatus including a touch panel through the same operation.

A display apparatus according to an embodiment of the presenting invention includes a display unit configured to display document data and/or content data including a plurality of objects, a focus-position control unit configured to control an arrangement position of a translucent focus area on the display unit, where the focus area is provided to make the object enter a selection state, and a contact-position detection unit configured to detect a position on the display unit, where a user contacts the display unit at the position. Further, the display apparatus includes a display control unit configured to move the focus area as the contact position is moved when the controlled arrangement position of the focus area is approximately equivalent to the detected contact position, and perform a predetermined operation associated, in advance, with an operation performed by the user to achieve the contact when the arrangement position of the focus area is different from the contact position.

Consequently, when the contact operation is performed when the focus area is arranged at the contact position, the object is made to enter the selection state. If the same contact operation is performed when the contact position is different from the arrangement position of the focus area, a predetermined behavior is performed.

The present invention allows for achieving various types of behaviors through the same operation since the type of a behavior performed in a display apparatus varies based on whether a focus area is arranged on the position of a part contacted by a user.

DESCRIPTION OF THE PREFERRED EMBODIMENTS

1. First Embodiment

Figure 1:
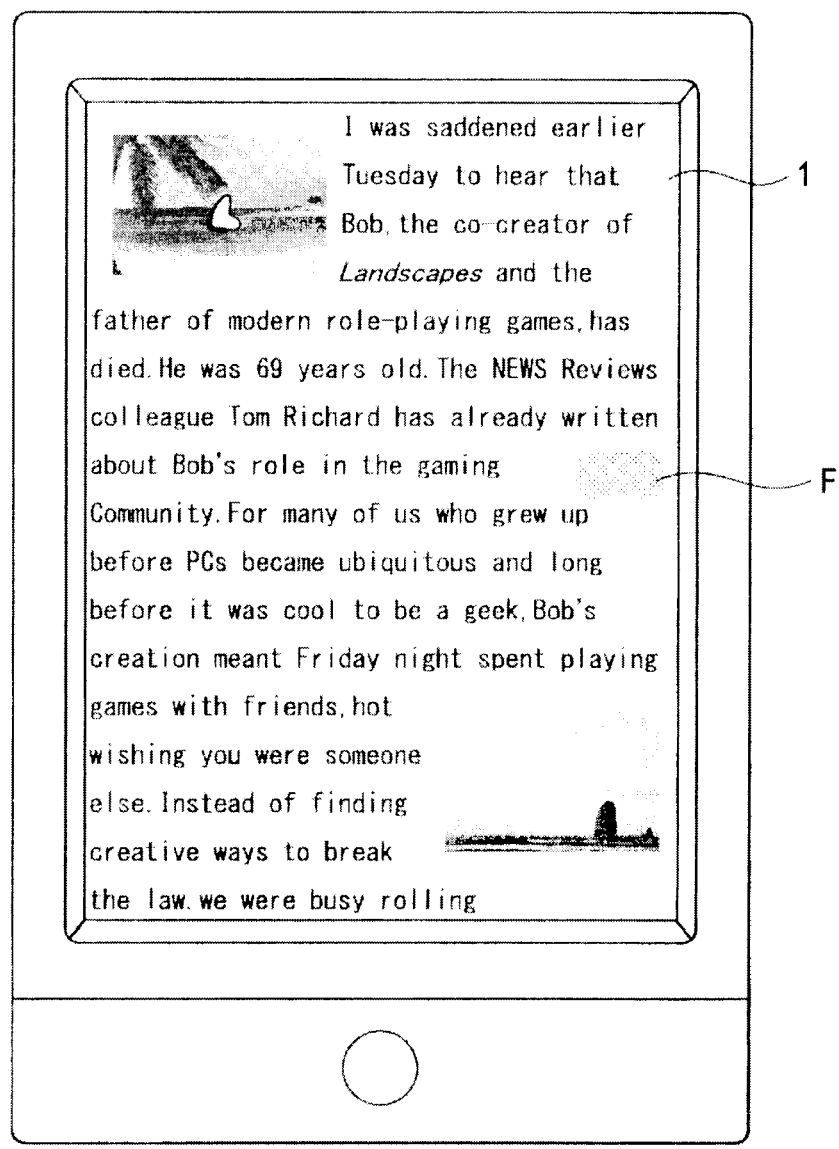
FIG. 1 is an external view of a mobile terminal exemplarily configured according to an embodiment of the present invention.

Hereinafter, a first embodiment of the present invention will be described with reference to the attached drawings. A display apparatus according to the above-described embodiment is used for a mobile terminal provided with a touch panel. FIG. 1 is an external view of an exemplary mobile terminal 10 according to the above-described embodiment. A display unit 1 including a liquid crystal panel, an organic electro luminescence (EL) panel, and so forth is provided on the front face of the mobile terminal 10, and document data including text data, photograph data, and so forth is displayed on the image area of the display panel. In the following description, each of components including word data, photograph data, data of the face of a person shown in the photograph, and so forth that are included in the document data is referred to as an object.

A focus area F which is translucent and formed into a waterdrop shape (oval) is provided on the right side of the center part of the image area of the display apparatus 1. The focus area F is a user interface provided to determine an object used to display attached information. When the object is determined through the focus area F, the attached information of the determined object is displayed near the focus area F through a tooltip. It is arranged that the size of the focus area F shall be changed based on the size of the determined object.

If the object includes, for example, data of a word, the attached information may be data of an equivalent for the word. In the case where the object includes, for example, data of a photograph, the attached information may be information about, for example, the place and the time when the photograph is taken. Further, when the object includes, for example, data of the face of a person, information about the name, etc. of the person may be displayed as the attached information. The position of the focus area F may be moved by a user performing a drag operation achieved by touching (contacting) the focus area F by a finger, a pen, etc. and moving the focus area F while maintaining the contact state.

[Exemplary Configuration of Mobile Terminal]

FIG. 1 is a block diagram showing an exemplary internal configuration of the mobile terminal 10. The mobile terminal 10 shown in FIG. 1 includes a display unit 1, a contact-position detection unit 2 configured to detect the position of a part contacted by the user, a focus-position control unit 3 configured to control the position of the focus area F, an arrangement-position-information-storage unit 4, and a display control unit 5.

The focus-position control unit 3 arranges the focus area F at any position on the image area of the display unit 1 when the mobile terminal 10 is started, for example. Upon accepting an operation performed to move the position of the focus area F by the user, the focus-position control unit 3 moves the focus area F based on the operation. Information about the arrangement position of each of the objects shown on the document data, the objects including the word data, the photograph data, and so forth, is stored in the arrangement-position-information storage unit 4.

The display control unit 5 performs processing so as to scroll-display the document data based on the details of an operation performed by the user, display the attached information of an object specified by the focus area F as the tooltip.

[Exemplary Operations of Mobile Terminal]

Next, exemplary processing procedures performed by the mobile terminal 10 according to the above-described embodiment will be described with reference to a flowchart shown in FIG. 3. At the outset, in the mobile terminal 10, the contact-position detection unit 2 determines whether it is detected that the user contacts the image area at step S1. If no contact made by the user is detected, the determination made at step S1 is made repeatedly. If the contact made by the user is detected, it is determined whether the focus area F is placed at the position where the contact is made at step S2.

When the focus area F is placed at the position, the focus area F is moved under the control of the display control unit 5 based on the contact position moved based on the drag operation performed by the user at step S3. Next, it is determined whether the movement of the contact position is stopped, that is to say, it is determined whether the user stops performing the drag operation for the focus area F at step S4. If the contact position is not stopped, the processing corresponding to step S3 is performed. If the contact position is stopped, it is determined whether or not the object is placed behind the focus area F at step S5. If the object is placed behind the focus area F, the attached information of the object is displayed near the focus area F as the tooltip at step S6.

Figure 4:
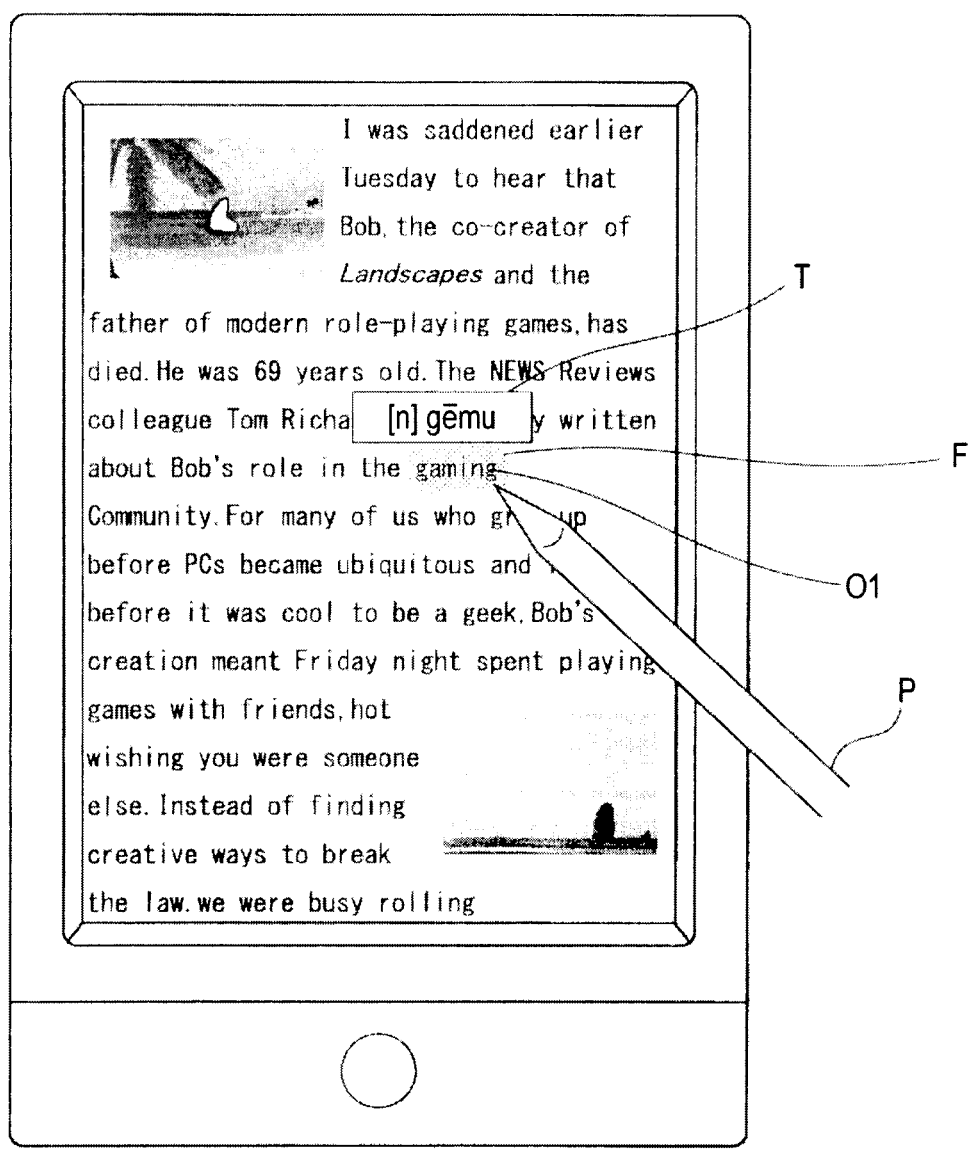
FIG. 4 is an illustration showing the state where a focus area according to an embodiment of the present invention is arranged on word data.

FIG. 4 shows the state where the attached information of the object is displayed near the focus area F. In FIG. 4, the focus area F is dragged by using a pen p and arranged on data of a word O1 shown as "gaming". Further, information shown as "[n] gēmu" is displayed above the focus area F as a tooltip T. The information "[n] gēmu" indicates a Japanese equivalent for the English word "gaming". Namely, the information "[n] gēmu" is the attached information of the information "gaming".

The display control unit 5 determines the details of the object placed behind the focus area F based on the information about the user's contact position detected by the contact-position detection unit 2, the position of the focus area F, the position being perceived by the focus-position control unit 3, and the arrangement position of each of the objects, where information about the arrangement position is stored in the arrangement-position-information storage unit 4. Then, the attached information of the object specified by the focus area F is acquired and displayed on the image area as the tooltip T.

Further, when the contact state is cancelled after the focus area F is arranged on a predetermined object by the user, the display control unit 5 performs control so that the focus area F stays on the object. Namely, the display control unit 5 performs control so that the arrangement position of the focus area F is the same as the arrangement position of the object until the focus area F is subsequently selected by the user and/or the speed of the contact position moved to scroll data shown on the image area is changed from a low speed to a different speed.

The information about the equivalent for the object O1, which is displayed as the attached information, is generated by providing a dictionary tool or the like in the mobile terminal 10 beforehand and reading the above-described equivalent information determined based on the focus area F. FIG. 4 shows the example where the object indicates the data of a word, and the information about the equivalent for the word is displayed as the attached information of the object. However, without being limited to the above-described embodiment, attached information that had been embedded by the writer of the document data at the document generation time may be extracted and displayed as the attached information.

Figure 3:
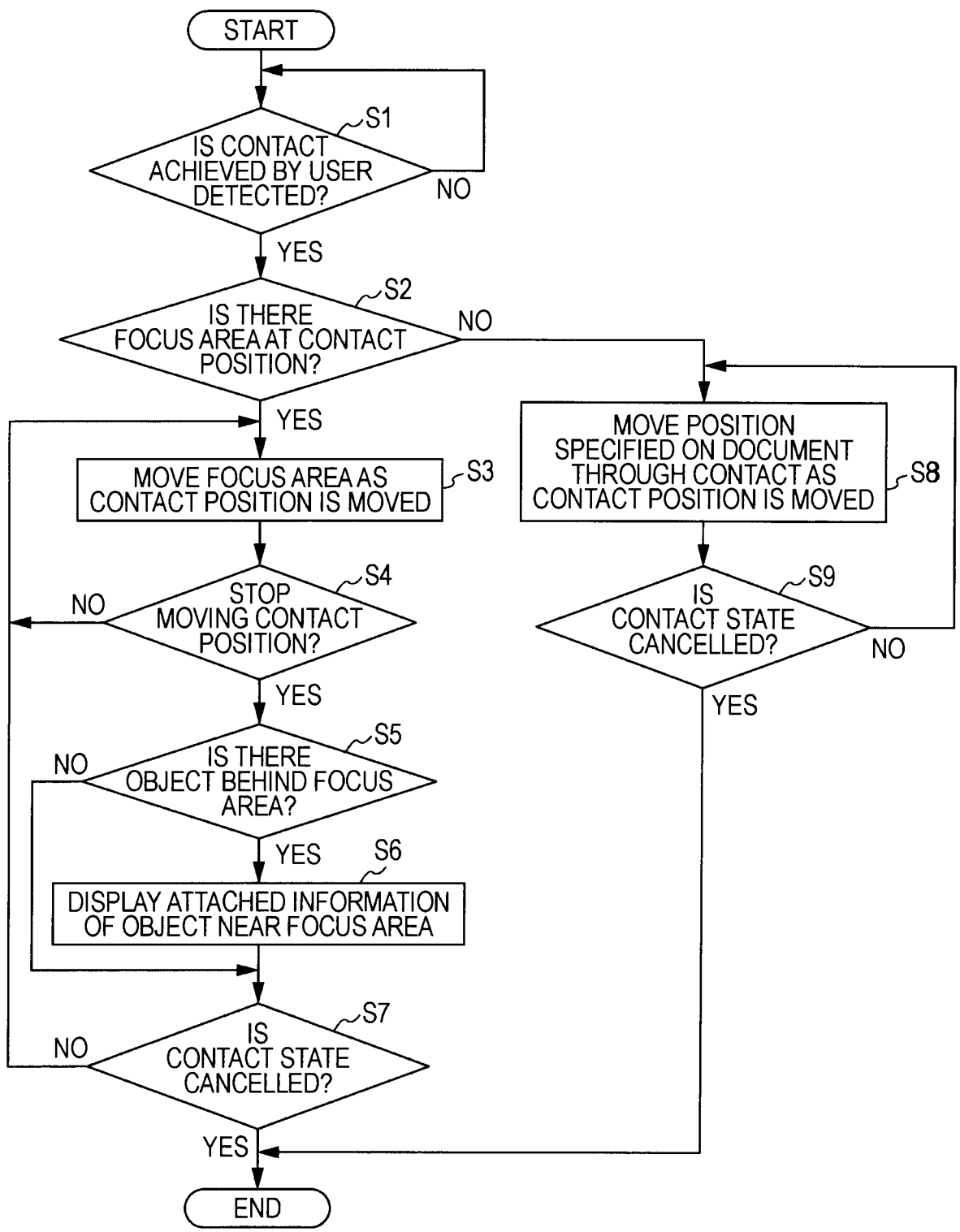
FIG. 3 is a flowchart showing exemplary processing procedures performed by a mobile terminal according to an embodiment of the present invention.
Figure 5:
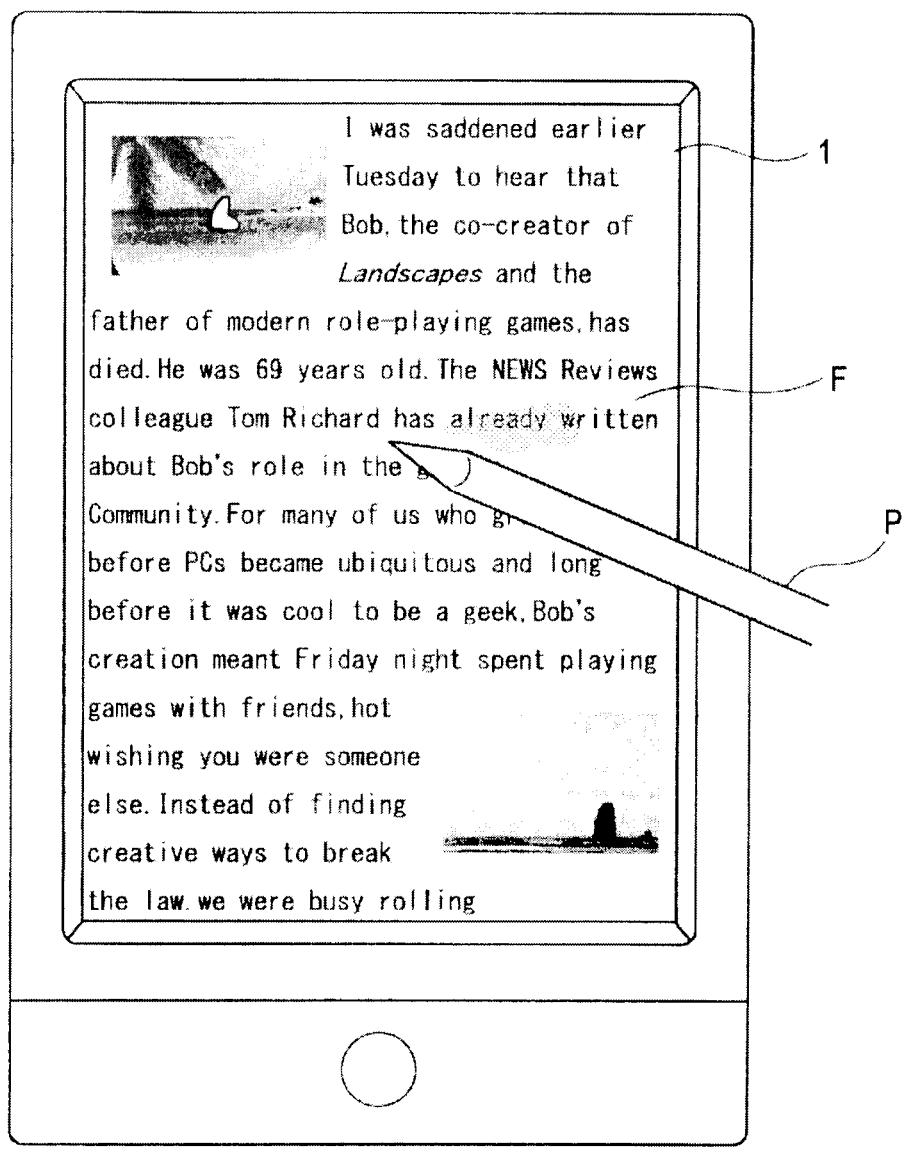
FIG. 5 is an illustration showing an exemplary image displayed when a focus area according to an embodiment of the present invention is moved.

Returning to the flowchart shown in FIG. 3, it is determined, at step S7, whether or not the contact state where the finger and/or the pen of the user comes into contact with the image area is cancelled after the attached information of the object is displayed at step S6. If the contact state is maintained, the processing is returned to step S3 so that the processing is continued. Namely, the position of the focus area F is moved in synchronization with the movement of the pen P under the control of the display control unit 5 as shown in FIG. 5.

Figure 6:
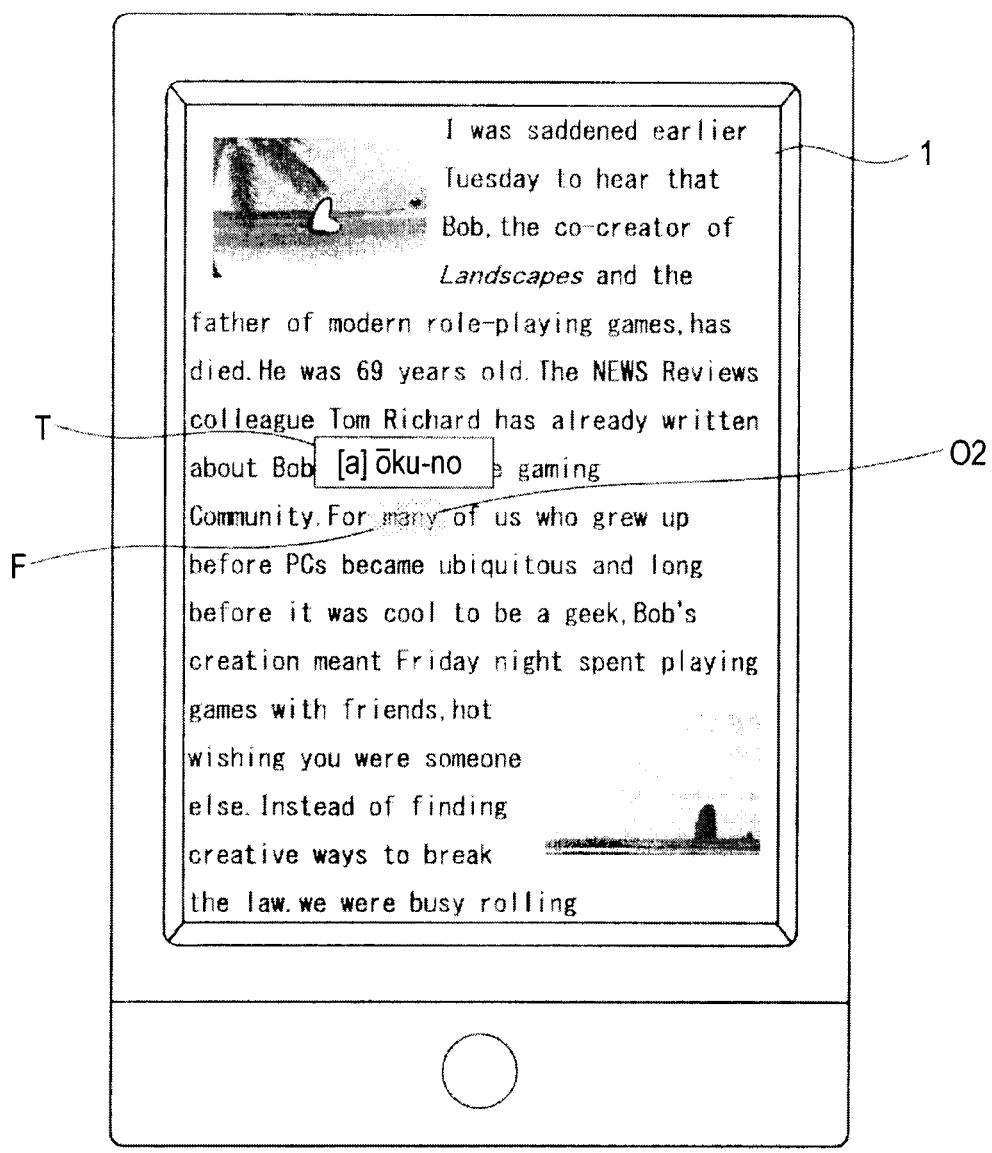
FIG. 6 is another illustration showing the state where a focus area according to an embodiment of the present invention is arranged on word data.

If it is determined that the movement of the contact position is stopped at step S4 and the object is placed behind the focus area F, information shown as "[a] oku-no" which indicates an equivalent for the term "many" shown as an object O2 is displayed as the tooltip T, where the equivalent information "[a] oku-no" is the attached information of the object O2 as shown in FIG. 6. If it is determined that the contact state is canceled at step S7, the processing is terminated.

On the other hand, if it is determined that the focus area F is not placed at the contact position at step S2, a position specified on the document data through the contact is moved as the contact position is moved based on the drag operation performed by the user at step S8. Then, it is determined whether or not the contact state is cancelled at step S9. If it is determined that the contact state is maintained, the processing is returned to step S8 and the processing is continued. If the contact state is cancelled, the processing is terminated.

Figure 7:
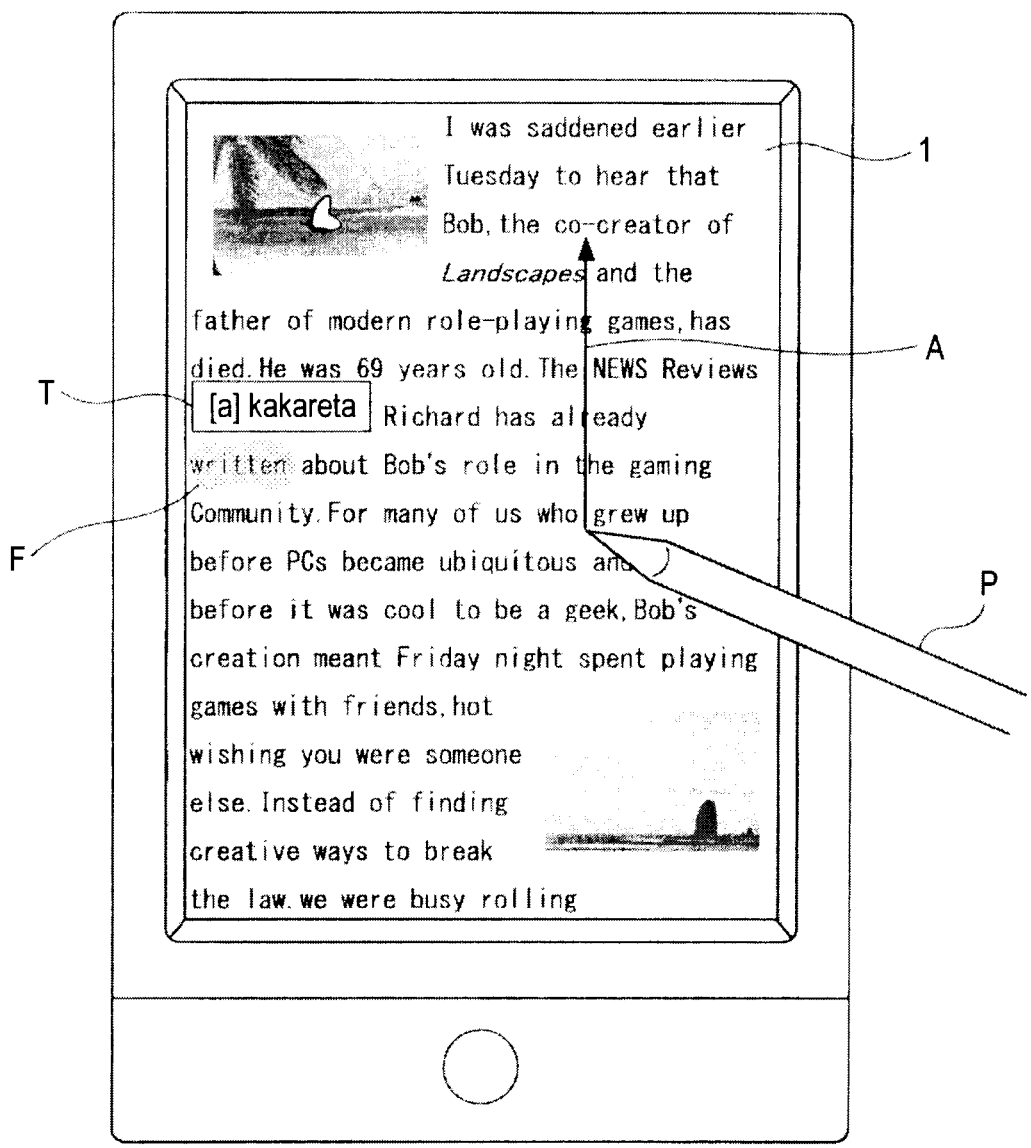
FIG. 7 is an illustration showing an exemplary image displayed when a contact position is different from a focus arrangement position according to an embodiment of the present invention.

FIG. 7 shows the case where the arrangement position of the focus area F is different from the position of a part contacted by the user by using the pen P according to the above-described embodiment. In FIG. 7, the focus area F is arranged on the word "written". Consequently, attached information shown as "[a] kakareta" which is an equivalent for the word "written" is displayed as the tooltip T. FIG. 7 also shows that the tip of the pen P points a part different from the arrangement position of the focus area F.

Figure 8:
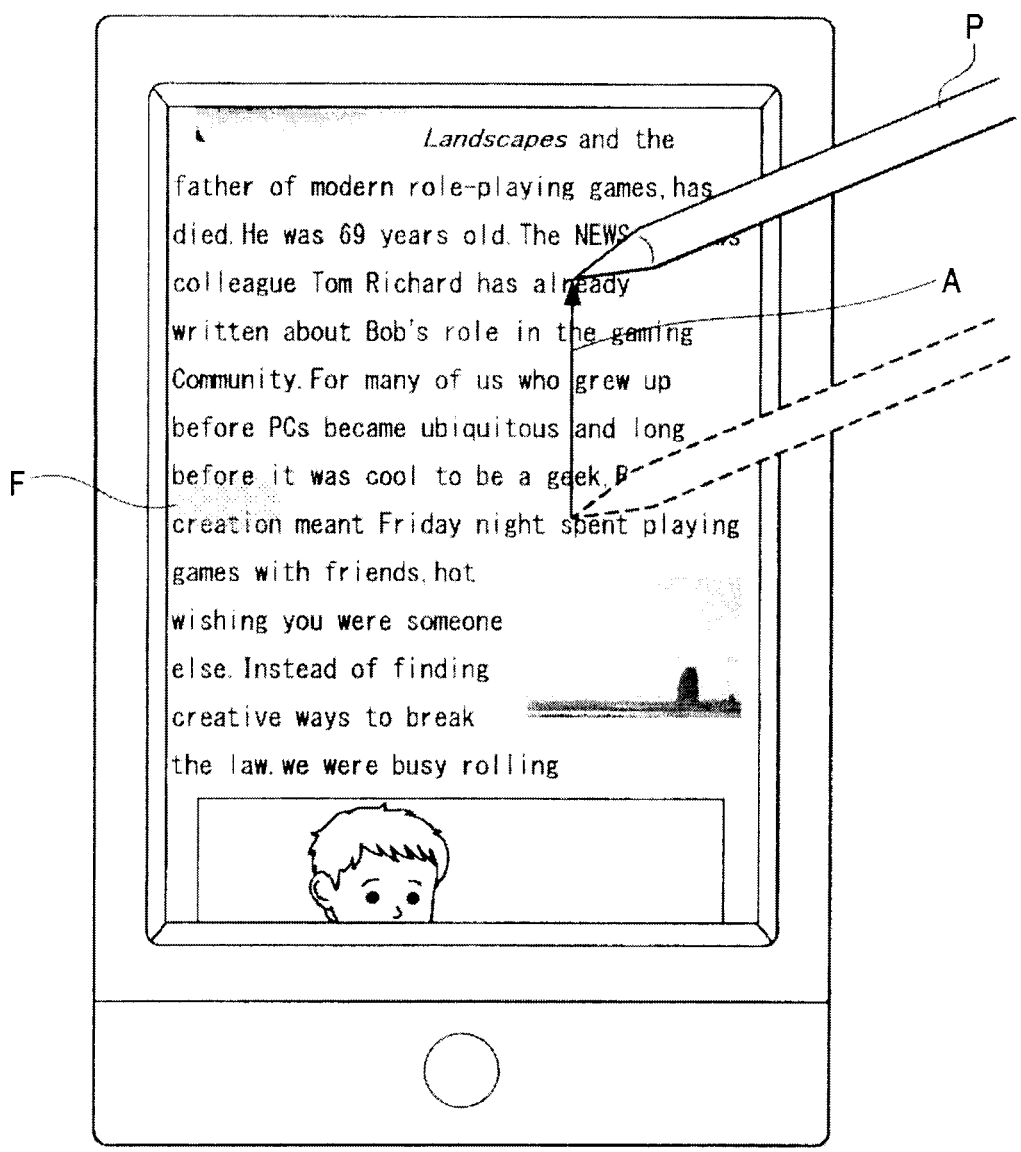
FIG. 8 is an illustration of an exemplary scroll operation performed as a contact position is moved according to an embodiment of the present invention.

FIG. 8 shows an exemplary display image obtained when the tip of the pen P is moved in a direction "A" while the tip of the pen P is kept in contact with the image area. FIG. 8 also shows the state where the document data is scrolled in the direction of the upper part of the image area in accordance with the amount of the movement of the pen P.

Advantages of First Embodiment

According to the first embodiment, the user moves the focus area F onto data of a word of which meaning is sought by the user, whereby the meaning of the word is displayed through the tooltip and confirmed by the user. Further, an image-area scroll operation of related art can be achieved by selecting and dragging a part of the image area, where the focus area F is not arranged on the part.

Namely, since an object can be selected by moving the focus area F, it becomes possible to create the state where attention is given to a certain object even though the object is not tapped even though an apparatus including a touch panel is used. If the position of a part tapped by the user is different from the arrangement position of the focus area F, an originally expected behavior that had been associated with the tap operation can be achieved. Although the image-area scroll operation is exemplarily performed in the above-described embodiment, different behaviors such as enlarging photograph data, reproducing music data, etc. can be achieved through the tap operation.

Further, since the focus area F is translucent and generated to have the waterdrop form, the user suffers from a reduced uncomfortable feeling caused by the focus area F while the size of the focus area F is large enough to surround the object including the word data, the photograph data, etc. Further, since the form of the focus area F can be increased in size compared to the cursor, etc., the user can easily select the focus area F with a finger and/or the pen P. Still further, since the focus area F is translucent, the information about the object itself selected by the focus area F can be displayed without being hidden.

2. Other Embodiments

Other Embodiment 1

The above-described embodiment allows for switching back and forth between the operation performed to move the focus area F and that performed to scroll data shown on the image area based on the relationship between the position of the contact made by the user and the arrangement position of the focus area F. However, the present invention can be achieved without being limited to the above-described embodiment. For example, control may be performed so that the document data is scroll-displayed when the focus area F is arranged at an end part of the image area of the display unit 1 even though the focus area F is touched by the finger and/or the pen P of the user.

Figure 9:
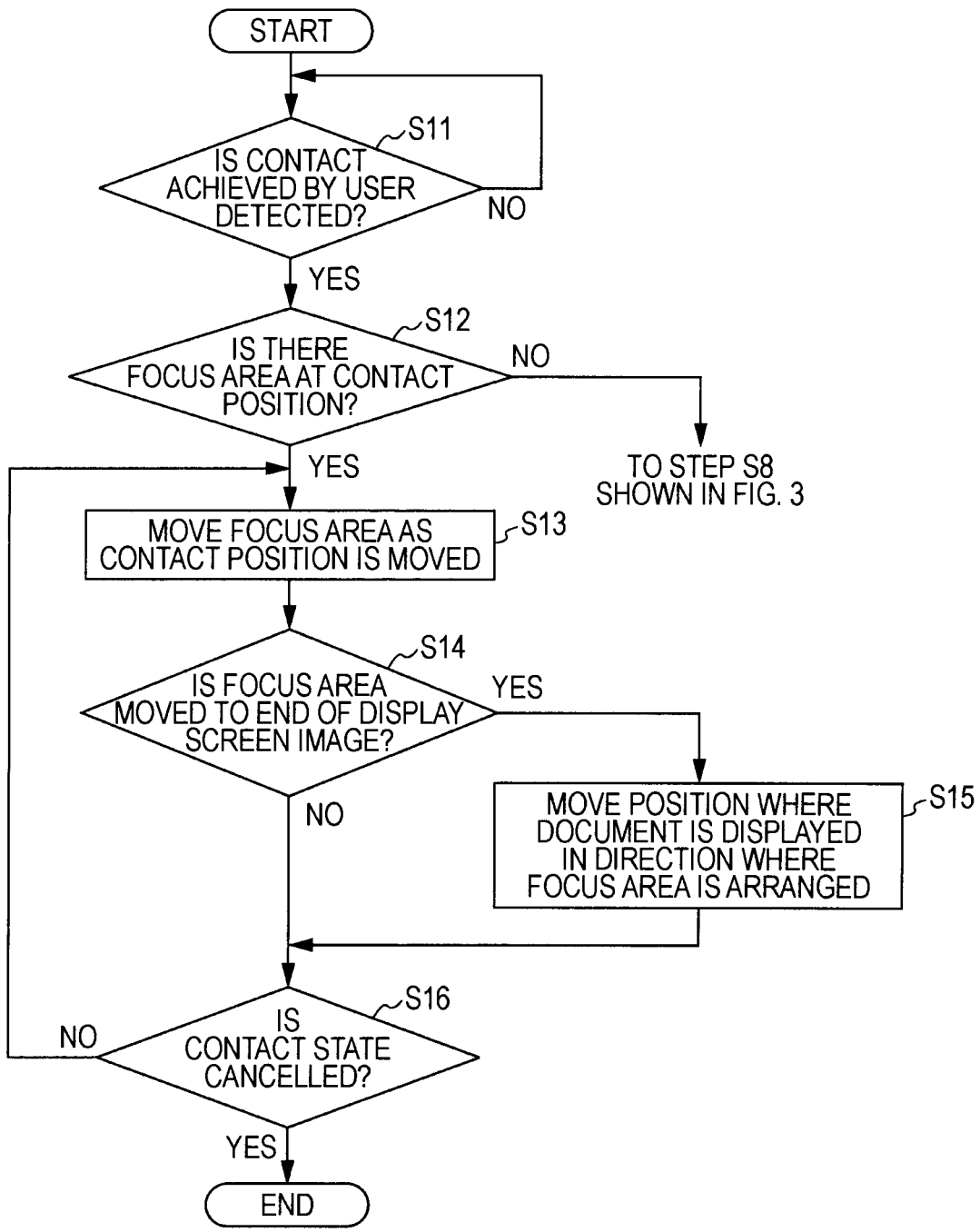
FIG. 9 is a flowchart showing exemplary processing procedures performed by a mobile terminal according to another embodiment of the present invention.

Exemplary processing procedures performed by the mobile terminal 10 in the above-described embodiment will be described with reference to a flowchart shown in FIG. 9. According to the flowchart shown in FIG. 9, the description of the processing performed to display the attached information of the object specified by the focus area F is omitted.

First, the contact-position detection unit 2 determines whether it is detected that the user contacts the image area at step S11. If no contact made by the user is detected, the determination made at step S11 is made repeatedly. If the contact made by the user is detected, it is determined whether the focus area F is placed at the position where the contact is made at step S12. If the focus area F is not placed at the contact position, the processing corresponding to step S8 shown in the flowchart of FIG. 3 is performed.

If the focus area F is placed at the contact position, the focus area F is moved under the control of the display control unit 5 in accordance with the contact position moved based on the drag operation performed by the user at step S13. Then, it is determined whether the focus area F is moved to the end part of the image area of the display unit 1 at step S14. If the focus area F is moved to the end part, the display position of the document data currently displayed on the image area is moved in the direction of the position where the focus area F is arranged at step S15. That is to say, processing is performed to scroll the document data when the focus area F is arranged at the end of the image area even though the focus area F is touched by the finger and/or the pen P of the user.

If it is determined that the focus area F is not moved to the end part of the image area at step S14, it is subsequently determined whether the state where the image area is touched by the user is cancelled at step S16. If the contact state is not cancelled, the processing is returned to step S13 so that the processing is continued. If the contact state is cancelled, the processing is terminated.

Figure 10:
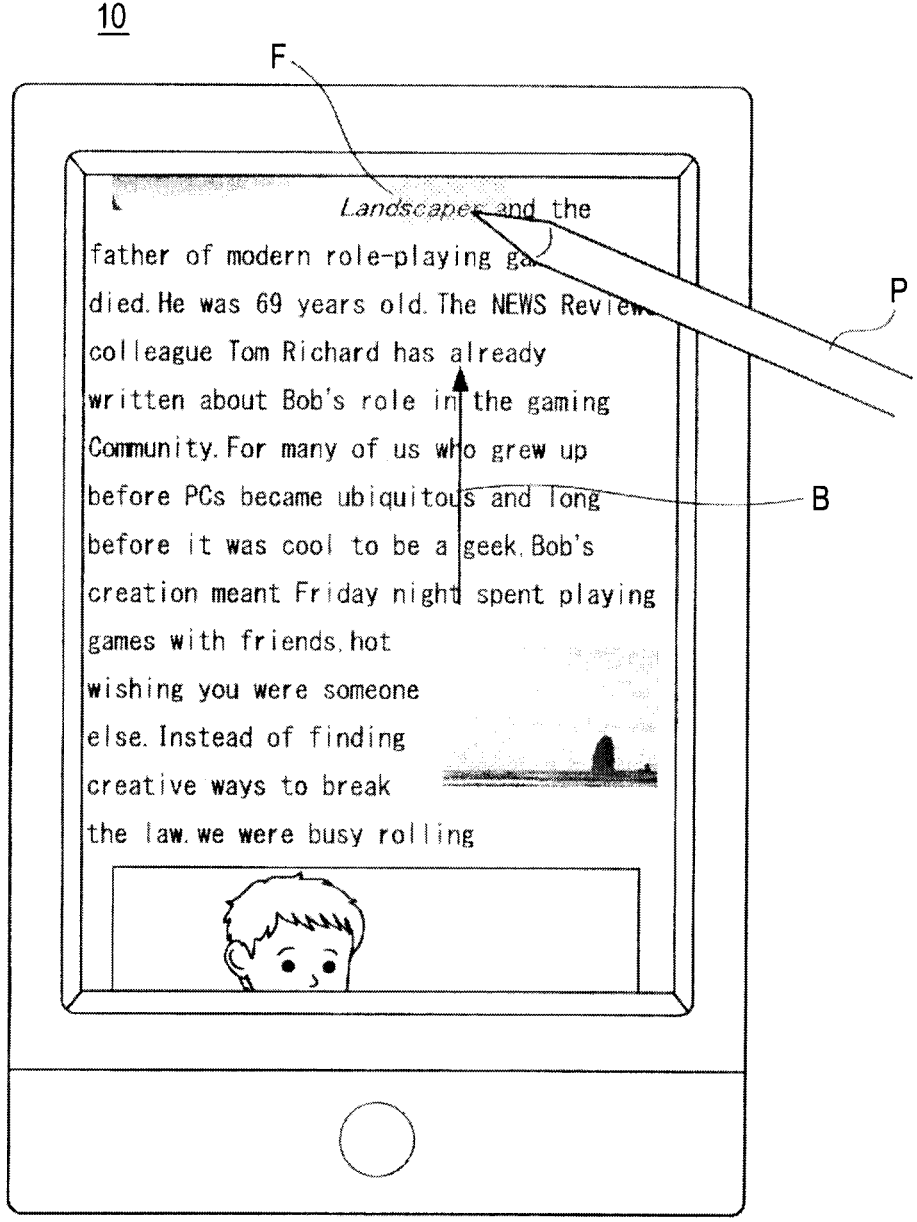
FIG. 10 is an illustration showing an example where a focus area according to another embodiment of the present invention is arranged at an end part of an image area.

The above-described processing is performed so that when the focus area F is arranged at the upper end of the image area, the document data is scrolled in the direction where the focus area F is arranged, where the direction is indicated by the sign "B", even though the focus area F is selected by the pen P as shown in FIG. 10. Consequently, when the focus area F is moved to an end part of the image area while the focus area F is moved based on the drag operation, the moving operation can be seamlessly shifted to an operation performed to scroll the document data without changing the details of the operation.

Other Embodiment 2

According to the above-described embodiments, the attached information of the object specified based on the arrangement position of the focus area F is displayed when the focus area F is arranged on any object by the user and the focus area F is stopped. However, the present invention can be achieved without being limited to the above-described embodiment. For example, when the focus area F is brought closer to a predetermined object, control may be performed so that the focus area F is attached to the object.

Each of FIGS. 11A, 11B, 11C, and 11D is the illustration of an exemplary movement of the focus area F, the movement being achieved in the above-described embodiment. In each of FIGS. 11A to 11D, the position of the part contacted by the user is indicated by a block dot. The focus area F is indicated by an oval and the object is indicated by a square. An object arranged on the left is an object O10, and that arranged on the right is an object O11. In each of the 11A to 11D, the contact position is indicated by the black dot so as to easily understand the description. However, the contact position is not actually displayed on the image area.

Figure 11A:
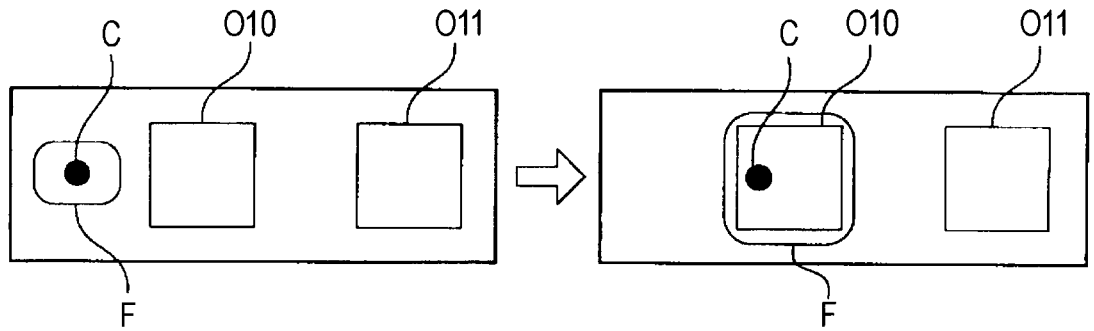
FIG. 11A is an illustration showing exemplary transition of the state of a focus area according to another embodiment of the present invention.

According to a drawing shown on the left side of FIG. 11A, the contact position C is arranged on the left side of the object O10, and the contact position C and the object O10 are separated by a large distance. Therefore, the focus area F is arranged at the contact position C and is not attached to the object O10. The right side of FIG. 11A shows an example where the contact position C is moved from where the contact position C had been in the above-described state to the right. As shown in the right side of the FIG. 11A, the contact position C is moved into the object O10. Therefore, the focus area F is attached to the object O10 and the shape of the focus area F is changed so that the object O10 is covered (surrounded) by the focus area F.

Figure 11B:
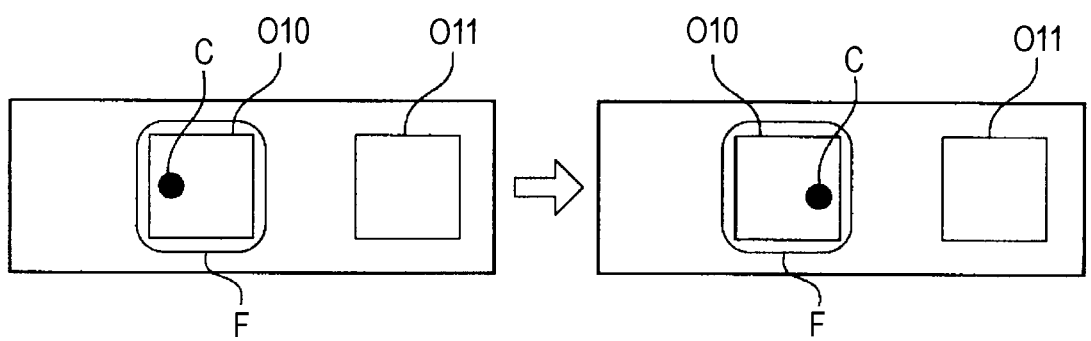
FIG. 11B is another illustration showing the exemplary transition of the state of the focus area.
Figure 11C:
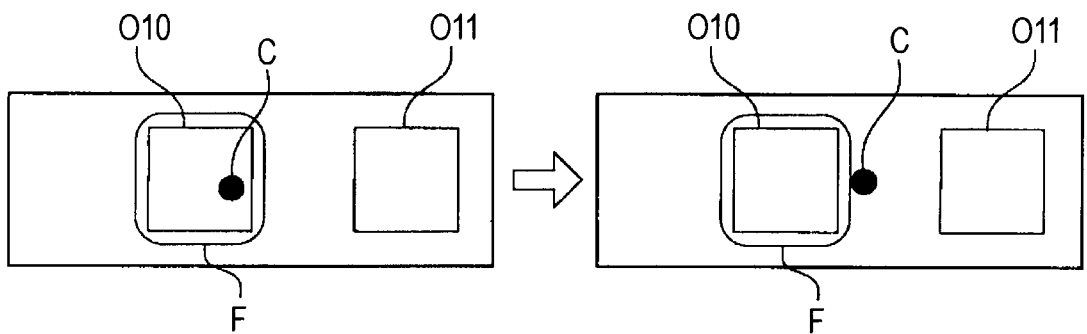
FIG. 11C is another illustration showing the exemplary transition of the state of the focus area.
Figure 11D:
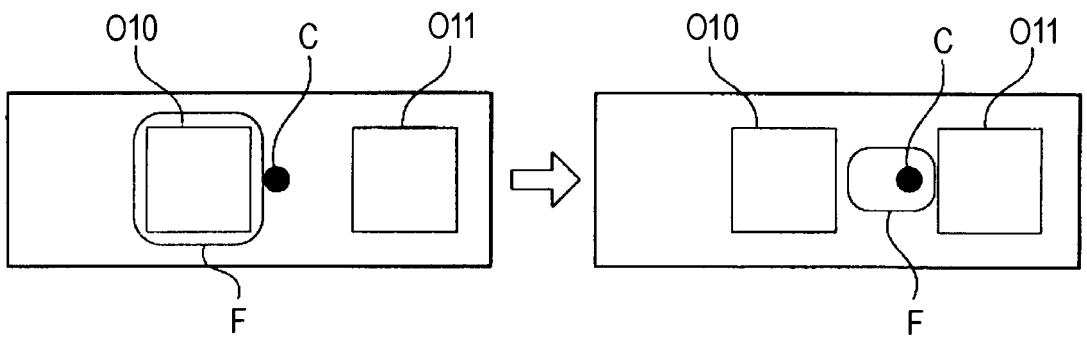
FIG. 11D is another illustration showing the exemplary transition of the state of the focus area.

As long as the contact position C is in the object O10 as shown in the left side and the right side of FIG. 11B, the focus area F is not moved from the arrangement position of the object O10. Further, if the contact position C is slightly moved from where it had been in the above-described state and out of the object O10, the focus area F does not leave the object O10 as long as the contact position C is placed near the object O10. If the contact position C is outside and sufficiently away from the object O10, the focus area F leaves the object O10. When the contact position C is further moved from where it had been in the above-described state to the right and brought closer to the object O11, the focus area F is attached to the object O11. The attach operation of the focus area F is set in advance so as to be performed when the focus area F is brought closer to the areas within a some-millimeter radius of the object.

Figure 12:
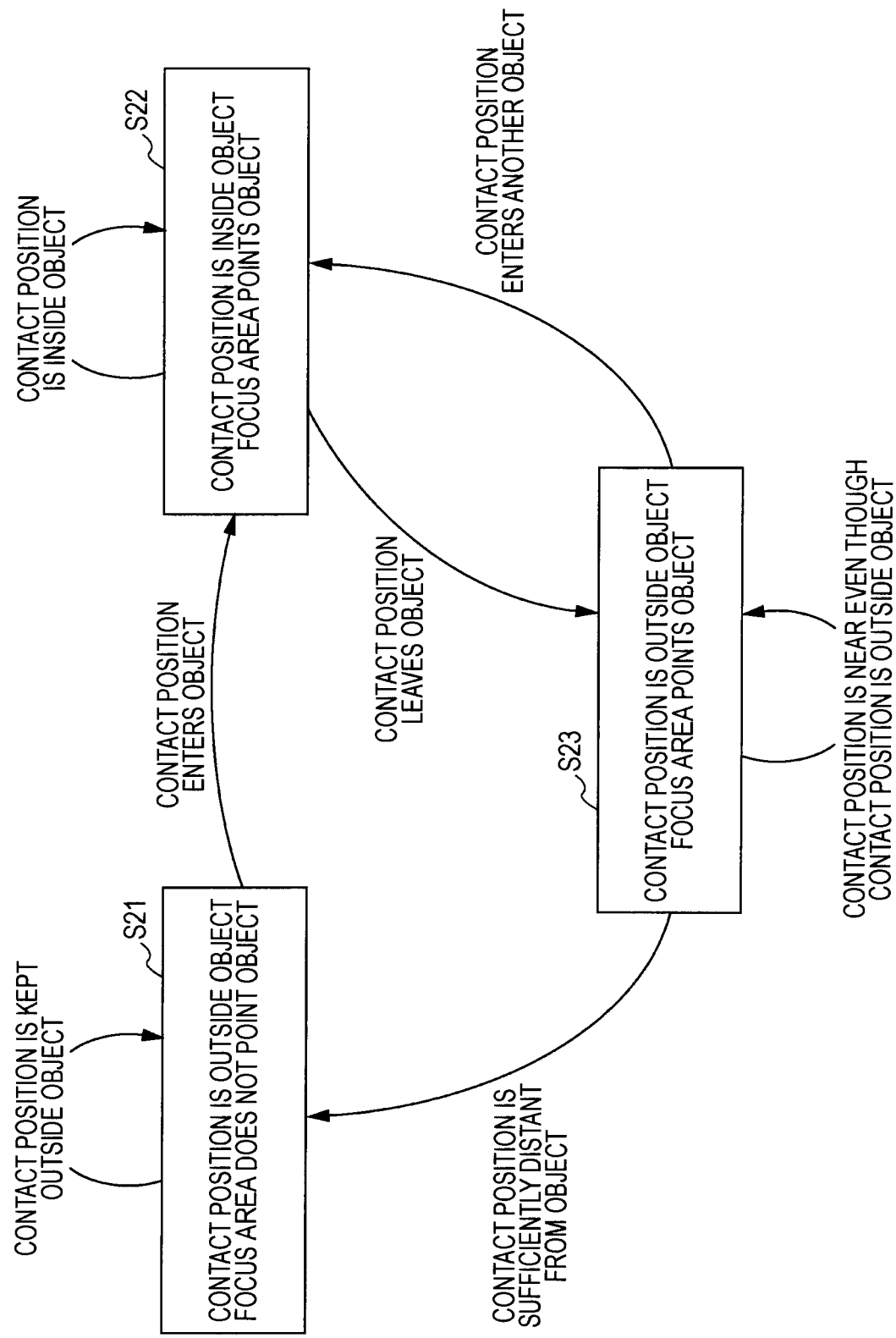
FIG. 12 is a state transition diagram showing exemplary transition of the state of a focus area according to another embodiment of the present invention.

FIG. 12 shows the above-described operations of the focus area F as a state transition diagram. If the contact position C is outside the object and the focus area F does not specify any object so that a state S21 is attained, the state S21 is not changed as long as the contact position C is stayed outside the object. If the contact position C is moved into the object in the state S21, the state is caused to transition to a state S22. Namely, the state where the contact position C is inside the object and the focus area F specifies the object is attained. The above-described state S22 is maintained as long as the contact position C is in the object.

If the contact position C is moved out of the object, the state is caused to transition to a state S23. Namely, the contact position C is outside the object and the focus area F specifies the object. The state 23 is not changed as long as the contact position C is near the object. However, if the contact position C is sufficiently away from the object, the state is caused to transition to the state S21. Namely, the state is changed to a state where the focus area F does not specify any object. On the other hand, when the contact position C is moved away from the object and into a different object, the state is caused to transition to the state S22 so that the focus area F specifies a different object.

The above-described processing procedures are performed so that the focus area F is automatically attached to a predetermined object even though the user does not correctly arrange the focus area F on the predetermined object. Namely, it becomes possible to arrange the focus area F on the predetermined object through a simple operation. Since the focus area F hardly leaves the object in that case, the user can confirm the attached information of the object specified by the focus area F with stability even though the document data is scrolled, for example.

Other Embodiment 3

Figure 2:
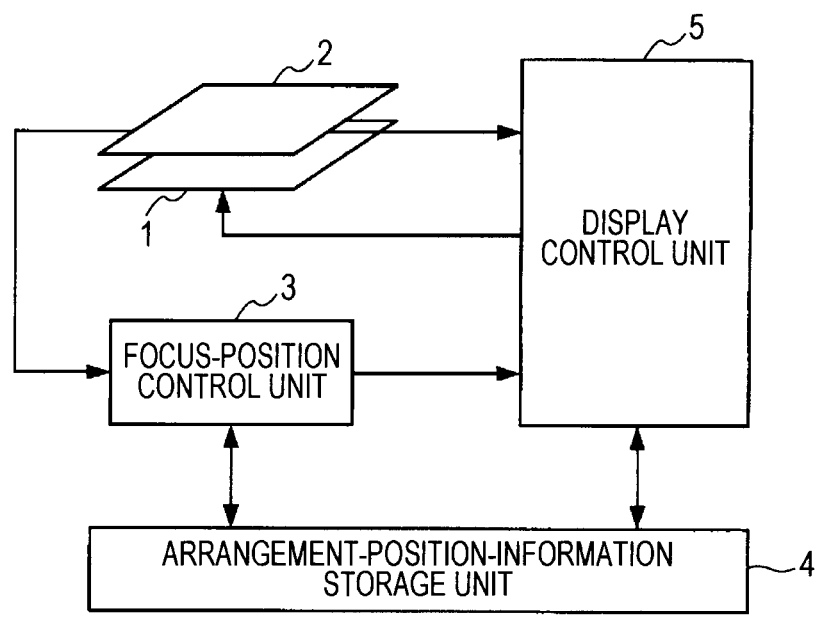
FIG. 2 is a block diagram showing an exemplary internal configuration of a mobile terminal according to an embodiment of the present invention.
Figure 13:
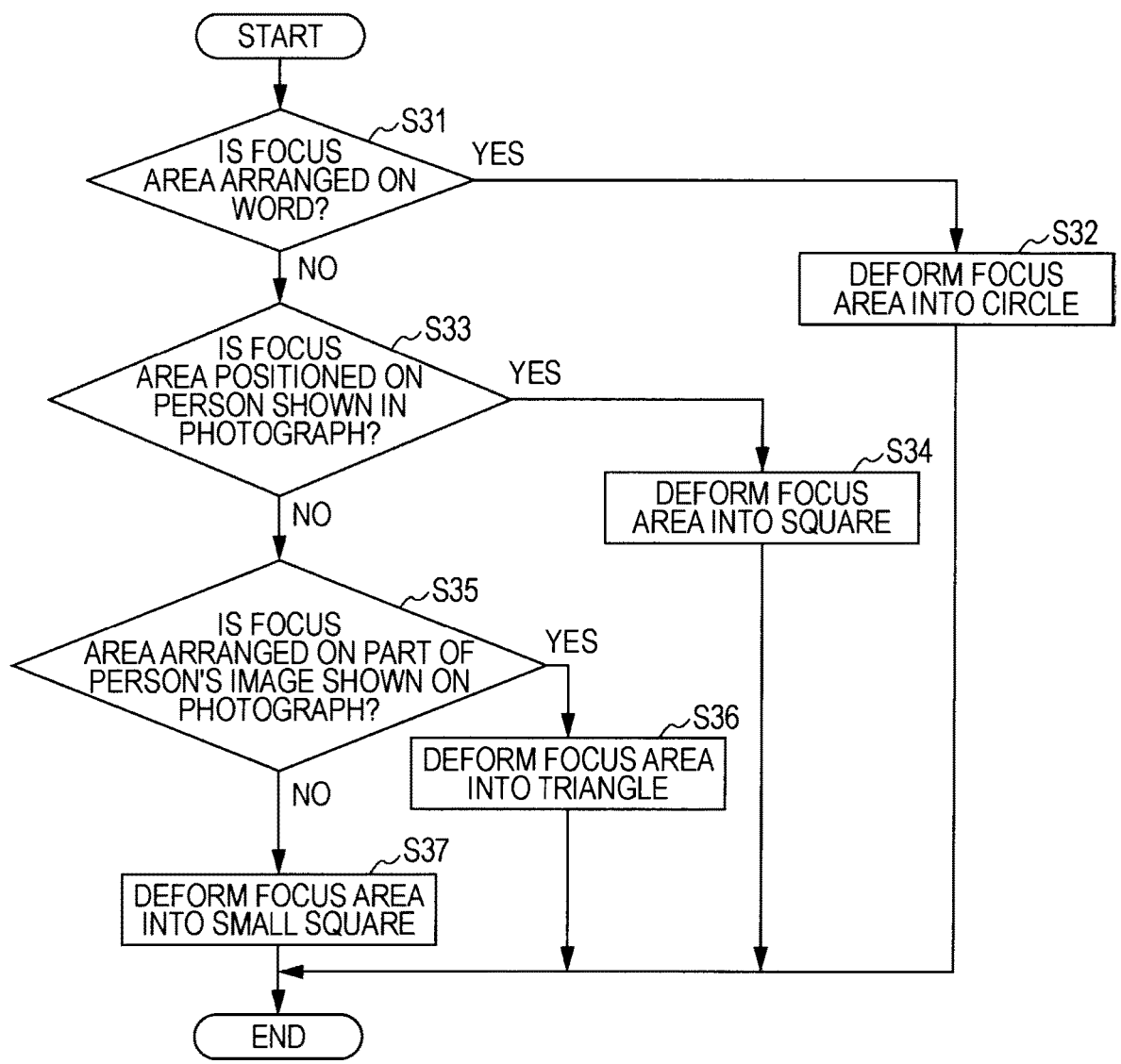
FIG. 13 is a flowchart showing exemplary processing procedures performed by a display control unit according to another embodiment of the present invention.

According to the above-described embodiments, the focus area F has the oval waterdrop form. However, the form of the focus area F may be changed to a different form based on the object type. FIG. 13 is a flowchart showing exemplary processing procedures performed in such cases by the display control unit 5 shown in FIG. 2.

Figure 14:
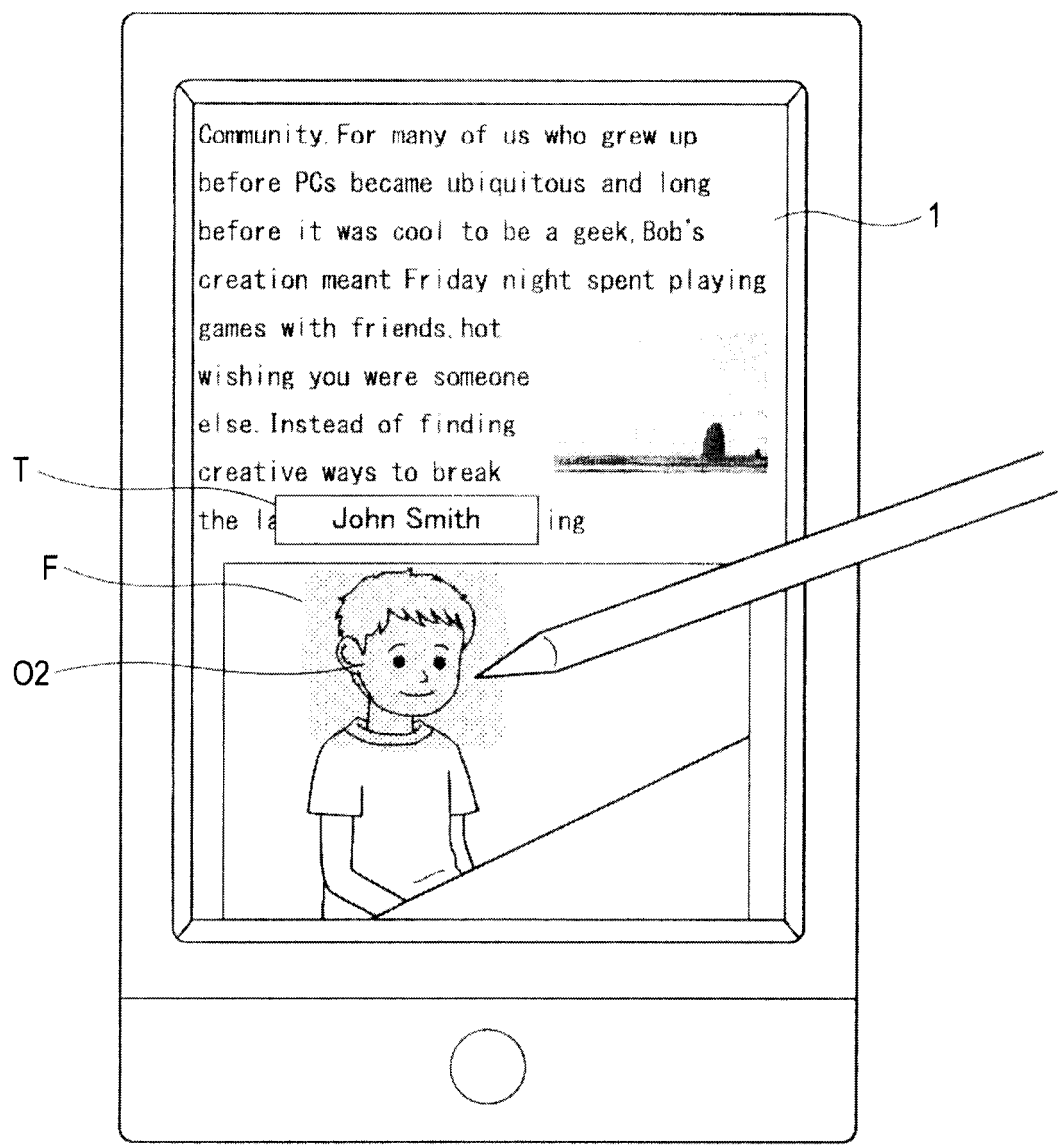
FIG. 14 is an illustration showing the state where a focus area according to another embodiment of the present invention is arranged on the image of a person shown on a photograph.

First, it is determined whether the focus area F is arranged on the data of a word at step S31. If the focus area F is arranged on the word data, processing is performed to change the form of the focus area F into a circle at step S32. If the focus area F is not arranged on the word data, it is determined whether the focus area F is arranged on the data of the person's image, the image data being shown on the photograph at step S33. If the focus area F is arranged on the image data, the form of the focus area F is changed into a square. FIG. 14 indicates an exemplary display image shown in the above-described embodiment. FIG. 14 shows the state where the focus area F is arranged on the face part of a person shown on photograph data O2 and the form of the focus area F is changed into the square. Further, the name "John Smith" is displayed through the tooltip T as the attached information of the person.

Figure 15:
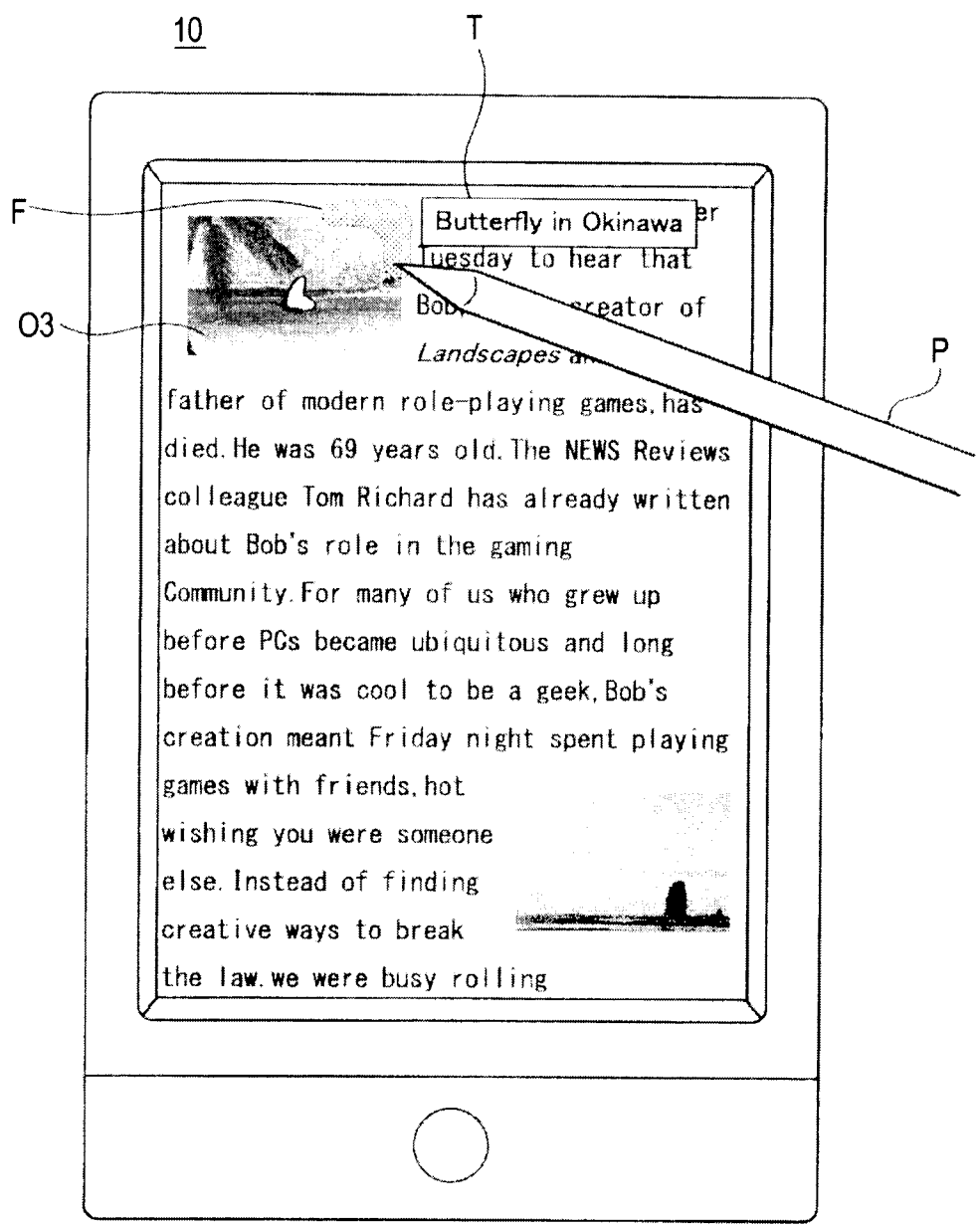
FIG. 15 is an illustration showing the state where a focus area according to another embodiment of the present invention is arranged on the image of a photograph.

Returning to the flowchart of FIG. 13, when it is determined that the focus area F is not arranged on the part of the person's image shown on the photograph data, it is determined whether the focus area F is arranged on a part of the photograph data, the part showing anything other than the person's image, at step S35. If it is determined that the focus area F is arranged on the photograph data, the form of the focus area F is changed into a triangle at step S36. FIG. 15 shows an exemplary display image attained in the above-described embodiment. FIG. 15 shows the state where the focus area F is arranged on photograph data 03 and the form of the focus area F is changed into the triangle. Further, information about the title "Butterfly in Okinawa" is displayed through the tooltip T as the attached information of the photograph data.

If it is determined that the focus area F is not arranged on the photograph data at step S35 shown in FIG. 13, the form of the focus area F is changed into a small square at step S37.

Thus, the form of the focus area F is changed based on the type of the object. Consequently, when the attached information of the object is displayed as the tooltip T, it becomes easy to visually understand to which object the attached information corresponds. For example, when the form of the focus area F is a triangle, it becomes possible to understand, at first sight, that the attached information indicated by the tooltip T is the attached information of the photograph data even though many items of data including word data, photograph data, and so forth are arranged near the tooltip T.

Other Embodiment 4

Further, in the above-described embodiments, the mobile terminal 10 provided with the touch panel including the display unit 1 and the contact-position detection unit 2 that are integrated into each other is exemplarily described. However, according to another embodiment of the present invention, the configuration may be changed so that a second contact-position detection unit 2A is provided on the back face of the mobile terminal 10.

Figure 16A:
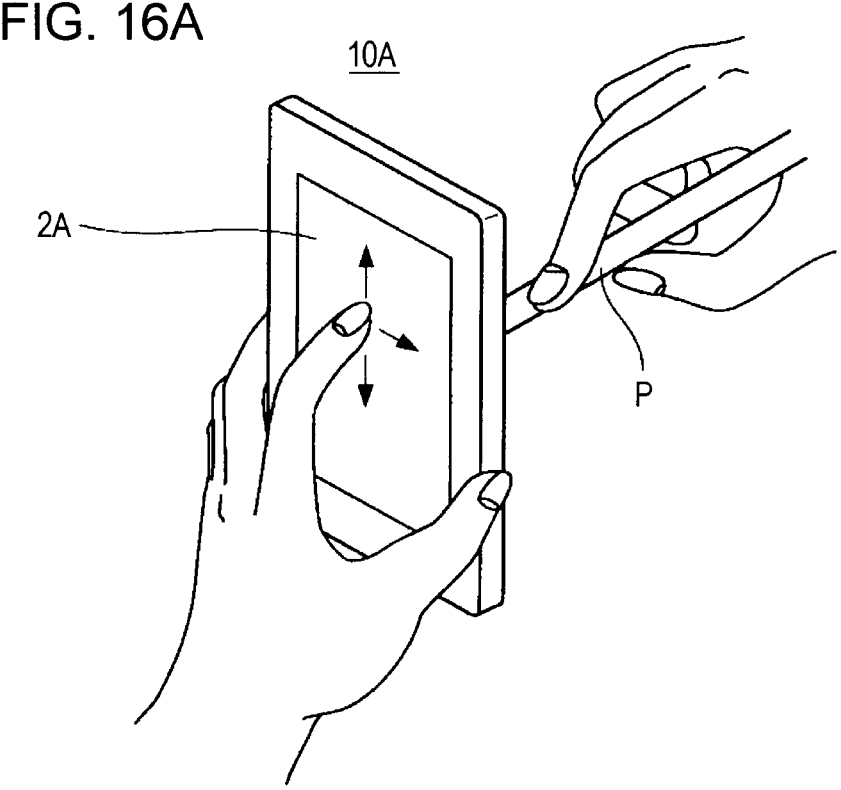
FIG. 16A is an external rear view of a mobile terminal exemplarily configured according to another embodiment of the present invention.
Figure 16B:
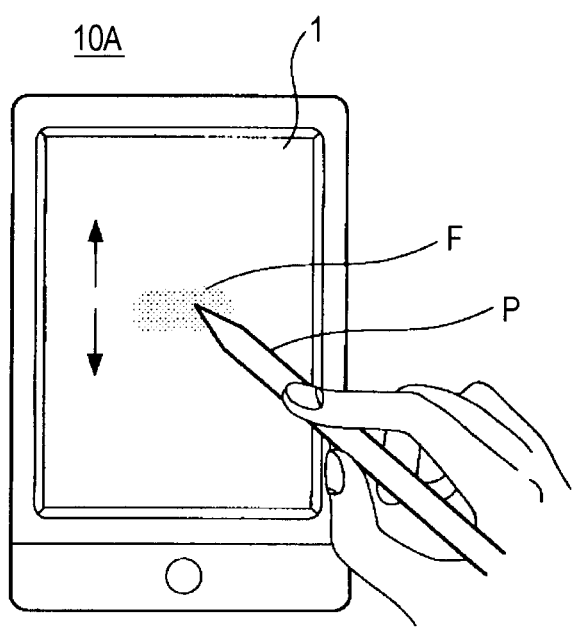
FIG. 16B is an external front view of the above-described mobile terminal.

Each of FIGS. 16A and 16B shows an external view of a mobile terminal 10A provided with the second contact-position detection unit 2A on the back face of the mobile terminal 10A. FIG. 16A shows the rear view of the mobile terminal 10A and FIG. 16B shows the front view of the mobile terminal 10A. According to FIG. 16A, the second contact-position detection unit 2A is provided on the entire back face of the mobile terminal 10A. The user can move the focus area F and/or scroll the document data by performing the drag operation by touching the second contact-position detection unit 2A with a finger, etc.

Further, as shown in FIG. 16B, the user can move the focus area F and/or scroll the document data by touching a part of the image area of the display unit 1 provided on the entire face of the mobile terminal 10A with a finger, the pen P, etc. and moving the contact position by performing the drag operation. According to the above-described mobile terminal 10A, the document data can be scrolled while the arrangement position of the focus area F is fixed by moving the finger on the second contact-position detection unit 2A provided on the back face while pointing the position of the focus area F on the display unit 1 provided on the front face with the tip of the pen P.

According to the above-described configuration, the user can fix and/or move the position of the focus area F to an appropriate position while scrolling the document data by using a finger. Namely, the selection operation and the scroll operation can be performed at the same time.

According to the above-described embodiments, only the single focus area F is displayed on the image area. However, a plurality of the focus areas F may be displayed on the image area so that at least two items of the attached information of a plurality of objects can be displayed at the same time. In that case, the focus area F may be separated into two parts in the middle or around by performing an operation as if to cut the focus area F from top to bottom with a finger and/or the pen P. Further, an operation achieved by dragging both the ends of the focus area F in different directions and/or a double-tap operation achieved by tapping the image area twice may be associated with an operation performed to display the separated parts of the focus area F.

Further, according to the above-described embodiments, the focus area F is automatically displayed when the mobile terminal 10 is started. However, it may be configured that the user can switch between the state where the focus area F is displayed and the state where the focus area F is not displayed.

Further, according to the above-described embodiments, the attached information of the object specified by the focus area F is displayed, for example. However, help information relating to the object may be displayed. Namely, the details of a context menu displayed when the click of the right mouse button is accepted may be displayed.

Further, according to the above-described embodiments, the display apparatus is used for the mobile terminal 10 (10A). However, without being limited to the above-described embodiments, the display apparatus may be used for a different apparatus provided with a touch panel, such as a mobile phone, a game terminal, a personal computer, and so forth.

The present application contains subject matter related to that disclosed in Japanese Priority Patent Application JP 2008-207432 filed in the Japan Patent Office on Aug. 11, 2008, the entire content of which is hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. A display apparatus comprising:
   a display unit;
   a touch panel configured to detect a user input; and
   a circuitry configured to
     control the display to display document data including a plurality of objects,
     make an object, among the plurality of objects, enter a focus area based on location of an area of the user input detected by the touch panel, wherein the object enters the focus area by moving in relation to the focus area and in accordance with a dragging operation of the user input, such that either the object is dragged towards the focus area by the dragging operation or the focus area is dragged towards the object by the dragging operation, thus reducing a distance between the object and the focus area until the object and the focus area displayedly overlap,
       wherein when the object is dragged towards the focus area by the dragging operation, the object is moved to travel in a same direction as a direction of travel of the dragging operation in accordance with which the object is dragged, and
       wherein when the focus area is being dragged towards the object by the dragging operation, the focus area is moved to travel in a same direction as a direction of travel of the dragging operation in accordance with which the focus area is dragged,
     scroll, in response to a scroll operation to the touch panel, the displayed plurality of objects without changing the focus area, and
     control, based on a condition that the object has entered the focus area as a triggering condition and when the relative movement between the focus area and the object has stopped for a predetermined amount of time, the display to display, as an overlay upon the displayed document data, a definition or linguistic translation of the object which has entered the focus area.

2. The display apparatus according to claim 1, wherein the focus area has a waterdrop form.

3. The display apparatus according to claim 2, wherein the circuitry is further configured to control the display to display information about the object which has entered the focus area arranged at an approximately same position as an arrangement position of the focus area near the focus area.

4. The display apparatus according to claim 1, wherein the circuitry scrolls the displayed plurality of objects toward a direction where the focus area is arranged when an arrangement position of the focus area is approximately equivalent to a position of the user input detected by the touch panel and the focus area is arranged at an end part of an image area of the display.

5. The display apparatus according to claim 4, wherein when the focus area is moved to be arranged near the object, the circuitry controls a form and an arrangement position of the focus area so that the focus area surrounds the object while gradually changing the form of the focus area.

6. The display apparatus according to claim 4, wherein the circuitry changes a size of the focus area based on a size of the object.

7. The display apparatus according to claim 4, wherein the circuitry changes a form of the focus area based on a type of the object.

8. The display apparatus according to claim 1, wherein when contact made by the user input is removed after the object has entered the focus area, the circuitry controls the object to remain within the focus area until a user subsequently manually repositions the focus area or moves the user input at a speed greater than a threshold.

9. The display apparatus according to claim 1, wherein the circuitry further controls the display to display, within a tooltip region, information related to the object that has entered the focus area.

10. The display apparatus according to claim 9, wherein the tooltip region is placed at a position near the focus area.

11. The display apparatus according to claim 9, wherein the information related to the object is retrieved from a stored information file.

12. The display apparatus according to claim 1, wherein when the focus area is positioned at an end part of an image area of the display, the circuitry controls the display to also scroll the displayed plurality of objects.

13. The display apparatus according to claim 1, further comprising a second touch panel provided on a back face of the display apparatus, the second touch panel configured to detect a second user input, wherein the circuitry is further configured to scroll the displayed plurality of objects according to the detected second user input.

14. The display apparatus according to claim 13, wherein the circuitry moves the focus area according to the movement of the user input, concurrently with scrolling the displayed plurality of objects according to the detected second user input.

15. The display apparatus according to claim 1, wherein upon a detection of a manipulation operation upon the focus area, the circuitry provides a plurality of focus areas that are each independently movable.

16. The display apparatus according to claim 1, wherein the circuitry maintains the object to remain within the focus area when a position of the user input moves out from a position at which the object is displayed but remains within a predetermined distance, and controls the object to detach from the focus area and the focus area to then attach to the position of the user input when the user input moves out from the position at which the object is displayed and beyond the predetermined distance.

17. The display apparatus according to claim 1, wherein the circuitry controls the display unit to display the linguistic translation of the object which has entered the focus area.

18. The display apparatus according to claim 1, wherein the circuitry initiates the displaying by the display, of the definition or linguistic translation of the object, upon a determination that the condition that the object has entered the focus area is satisfied and the relative movement between the focus area and the object has stopped for the predetermined amount of time.

19. The display apparatus according to claim 1, wherein the movement of the object during the dragging operation mirrors a path of the movement of a position of a touch contact of the user input upon the touch panel during the dragging operation.

20. A display method comprising the steps of:
   displaying document data including a plurality of objects;
   detecting a user input made on a touch panel;
   making an object, among the plurality of objects, enter a focus area based on location of an area of the user input detected by the touch panel, wherein the object enters the focus area by moving in relation to the focus area and in accordance with a dragging operation of the user input, such that either the object is dragged towards the focus area by the dragging operation or the focus area is dragged towards the object by the dragging operation, thus reducing a distance between the object and the focus area until the object and the focus area displayedly overlap, wherein when the object is dragged towards the focus area by the dragging operation, the object is moved to travel in a same direction as a direction of travel of the dragging operation in accordance with which the object is dragged, and wherein when the focus area is being dragged towards the object by the dragging operation, the focus area is moved to travel in a same direction as a direction of travel of the dragging operation in accordance with which the focus area is dragged;

scrolling, in response to a scroll operation to the touch panel, the displayed plurality of objects without changing the focus area; and displaying, upon satisfying a triggering condition that the object has entered the focus area and when the relative movement between the focus area and the object has stopped for a predetermined amount of time, a definition or linguistic translation of the object which has entered the focus area, as an overlay upon the displayed document data.

21. The display method of claim 20, further comprising the steps of:

maintaining the object to remain within the focus area when a position of the user input moves out from a position at which the object is displayed but remains within a predetermined distance; and detaching the object from the focus area and attaching the focus area to the position of the user input when the user input moves out from the position at which the object is displayed and beyond the predetermined distance.

22. A non-transitory information storage medium encoded with a program, when executed by a computer, making the computer execute the steps of:

displaying document data including a plurality of objects;

detecting a user input made on a touch panel;

making an object, among the plurality of objects, enter a focus area based on location of an area of the user input detected by the touch panel, wherein the object enters the focus area by moving in relation to the focus area and in accordance with a dragging operation of the user input, such that either the object is dragged towards the focus area by the dragging operation or the focus area is dragged towards the object by the dragging operation, thus reducing a distance between the object and the focus area until the object and the focus area displayedly overlap, wherein when the object is dragged towards the focus area by the dragging operation, the object is moved to travel in a same direction as a direction of travel of the dragging operation in accordance with which the object is dragged, and wherein when the focus area is being dragged towards the object by the dragging operation, the focus area is moved to travel in a same direction as a direction of travel of the dragging operation in accordance with which the focus area is dragged;

scrolling, in response to a scroll operation to the touch panel, the displayed plurality of objects without changing the focus area; and displaying, upon satisfying a triggering condition that the object has entered the focus area and when the relative movement between the focus area and the object has stopped for a predetermined amount of time, a definition or linguistic translation of the object which has entered the focus area, as an overlay upon the displayed document data.

23. The non-transitory information storage medium of claim 22, wherein the computer is made to further perform the steps of:

maintaining the object to remain within the focus area when a position of the user input moves out from a position at which the object is displayed but remains within a predetermined distance; and detaching the object from the focus area and attaching the focus area to the position of the user input when the user input moves out from the position at which the object is displayed and beyond the predetermined distance.

* * * * *